Dec. 30, 1958     H. MAZZA ET AL     2,866,688
PROCESS FOR PRODUCING AMORPHOUS BORON OF HIGH PURITY
Filed Aug. 22, 1955
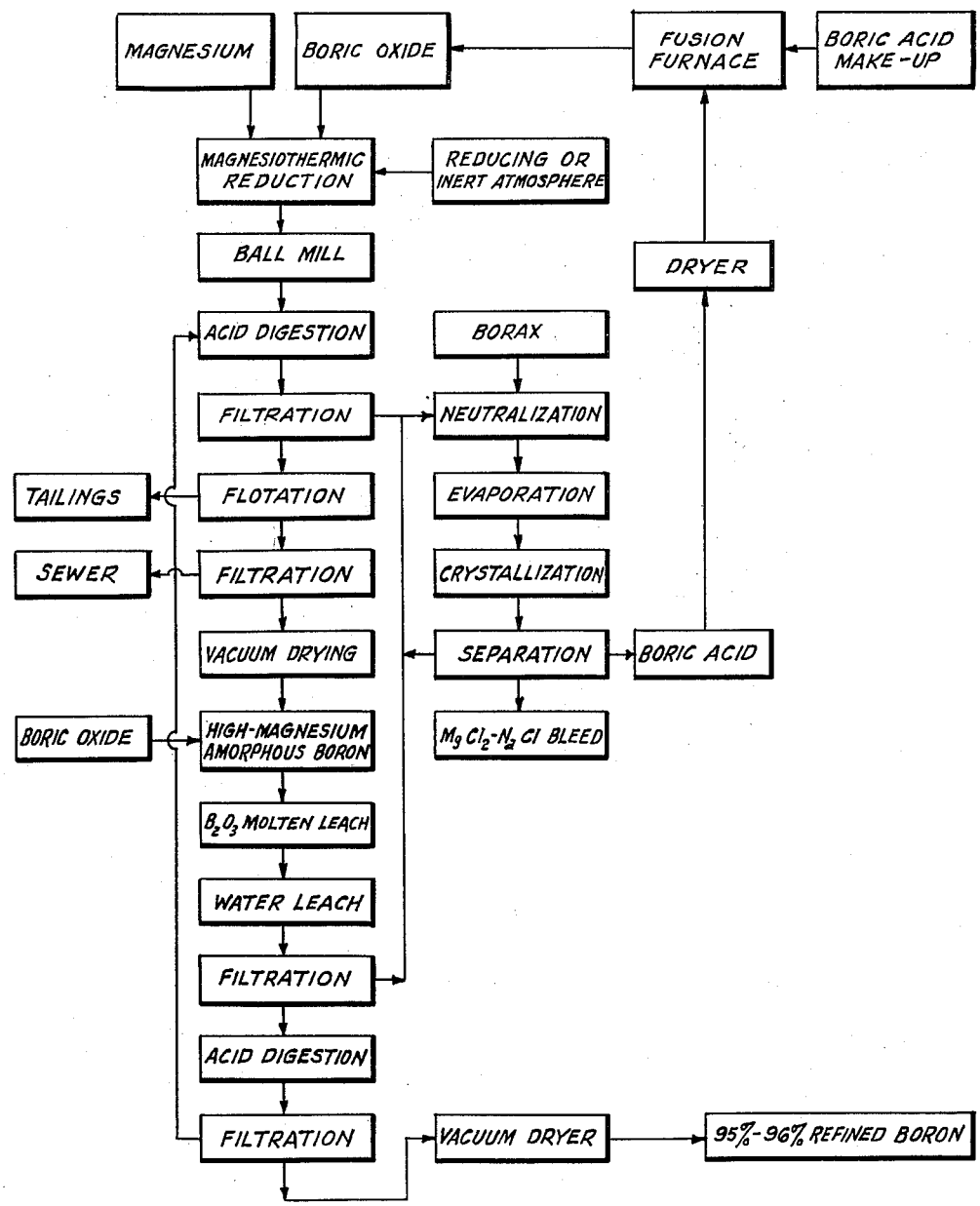
INVENTORS
Harold Mazza
Dwight L. Sawyer
Rodger W. Baier
ECKHOFF & SLICK
ATTORNEYS

United States Patent Office 2,866,688
Patented Dec. 30, 1958

2,866,688

PROCESS FOR PRODUCING AMORPHOUS BORON OF HIGH PURITY

Harold Mazza, Dwight L. Sawyer, and Rodger W. Baier, Trona, Calif., assignors to American Potash and Chemical Corporation, a corporation of Delaware Application August 22, 1955, Serial No. 529,862

10 Claims. (Cl. 23—209)

This invention relates to an improved magnesiothermic process for producing amorphous boron of high purity, one containing 95–96% boron, and which is essentially free of boron suboxides.

We have found that the ratio of boric oxide to magnesium in the magnesiothermic process is critical. Thus, if one uses a relatively large ratio, e. g., three parts of boric oxide to one of magnesium, one obtains upon acid digestion of the reaction products and subsequent beneficiation by froth flotation, a material containing about 90% boron and a substantial quantity of boron suboxides. If one uses a smaller ratio, one of the order of 1.5 to 1 as compared to 3 to 1, one obtains a product by similar treatment which contains about 87% boron, but which is essentially free of boron suboxides. We have found that a magnesiothermic boron product which is substantially free of boron suboxides can be leached with molten boric oxides to remove impurities present and provide a product containing 95% and better of boron. This is not true with an otherwise similar product but which results from the use of a boric oxide-magnesium mixture having a weight ratio of the order of 3 to 1. The boron suboxides are insoluble in the molten boric oxide whereas the magnesium impurities are readily removed by such treatment.

The ratio of boric oxide to magnesium to be employed in the magnesiothermic reaction is relatively critical in that a ratio of 3 to 1 results in a crude boron product, produced as described above, having such a suboxide content that the molten boric oxide leach is substantially ineffective in removing more than about 2% of the materials present as impurities. For example, a 3 to 1 ratio of reactants will produce a product containing not more than 90% boron. This product, we have found, can be up-graded slightly to a maximum of 92%. When a 1.5 to 1 ratio of reactants is employed, conditions being otherwise similar to those employed with the 3 to 1 ratio reactants, the initial product contains about 87% boron. However, this material can be extracted with molten boric oxide to give a final product containing 95% boron and even more. Therefore, we prefer a ratio of boric oxide to magnesium of 1.5 to 1 since the product produced can be up-graded from 87% boron to 95% and higher. This is also true at ratios below 1.5 to 1 and we have used mixtures containing equal parts, a 1 to 1 ratio; the reaction at the lower ratios is, however, quite violent and for this reason we prefer to use a mixture of boric oxide and magnesium having a 1.5 to 1 ratio. As one exceeds the 1.5 to 1 ratio and approaches the 3 to 1 ratio, the initial boron content increases, but, correspondingly, the ability to up-grade the initial material diminishes and one should therefore, for best results, use a ratio of substantially 1.5 to 1.

It is an object of the present invention to provide a process for producing a magnesiothermic boron product essentially free of boron suboxides.

A further object is to provide a process for production of a magnesiothermic boron product containing at least 95% boron.

In the process for working up the reaction products resulting from the magnesiothermic reduction of boric oxide, the crude material is treated one or more times with hydrochloric acid to convert the majority of the unreacted magnesium present to magnesium chloride which is removed with the spent acid. We have found that one can neutralize the spent acid with an alkali borate to produce boric acid which is separated, dried and decomposed to form boric oxide. The latter is recycled for use in the production of additional crude boron, thus promoting the over-all efficiency of the process.

An additional object of the invention is to provide an economical process for production of boron and wherein the boric oxide employed can be derived largely from an alkali borate and a spent acid available as a waste product in the process.

In addition to the foregoing, the process includes other objects and features of advantage which will appear hereinafter. The drawing accompanying and forming a part hereof is a digrammatic flow-sheet illustrative of the present preferred manner of practicing the invention.

As a general outline of the process and referring particularly to the drawing, appropriate quantities of boric oxide and magnesium, each of suitable fineness, are prepared and are placed in a container. The magnesiothermic reaction is initiated under the protection of an inert or reducing atmosphere such as is provided by an atmosphere of helium, neon, argon, krypton, xenon, hydrogen, methane, ethane, propane, butane, carbon monoxide, carbon dioxide, and ammonia. The reaction is highly exothermic and rapidly goes to completion following which the mass is permitted to cool. The protection of the inert or reducing atmosphere is continued from initiation of the reaction until the mass is cool. To provide the inert atmosphere we have used ammonia but one can employ any other inert atmosphere or a reducing gas, the requirement being to minimize the presence of oxygen during the magnesiothermic reaction and while the mass is still hot. The cold crude reaction mass is broken into pieces suitable for grinding and these are then ground. The resulting mass is then extracted with hydrochloric acid as a first acid digestion, the acid present being in some excess over that required to convert the magnesium present to magnesium chloride. The remaining solids are separated by filtration and are subsequently processed further as is the spent acid solution from the filtration.

The solids separated by filtration are repulped in water and subjected to a froth flotation for removal of impurities which are carried off in the froth. The froth flotation is carried on in any of the usual flotation cells and with any of several common flotation reagents. We have used a pine oil-resin oil mixture with success. With an atmosphere of ammonia protecting the magnesiothermic reaction, these impurities are essentially boron nitride.

The under-flow solids from the flotation are separated by filtration, given a water displacement wash and vacuum dried. The crude boron product is then mixed with boric oxide and the mixture is heated to an elevated temperature for a period adequate to the leach. We have used a leach at 800° C. for from one to two hours employing about 7.5 parts of the boric oxide to 1 of the crude material. One can, however, use more material and a shorter time period or a lower temperature and a longer time period. The conditions of the molten boric oxide leach are quite flexible in this respect. Boric oxide does not have a definite melting point and there is no sharp temperature range in which the molten material is effective. One can, therefore, select a temperature-time relationship suited to the equipment at hand. As we have said, we use molten boric oxide at 800° C. for an hour or two.

If the ratio of boric oxide to crude material is reduced much below 7.5 parts to 1, the leach is not as effective. The molten boric oxide leach can be used to up-grade any crude boron containing material so long as the material is free of the boron suboxide. Thus, we have used the leach to up-grade the crude boron resulting from the sodium reduction of $KBF_4$, and the crude boron obtained by the magnesiothermic reduction of anhydrous sodium tetraborate. The molten mass after being allowed to cool, is then crushed and water leached to remove boric oxide. The solids are separated by filtration, digested with excess hydrochloric acid as a second acid digestion, refiltered and vacuum dried to provide the boron product. Depending on the ratio of boric oxide to magnesium, the final product can have a boron content of from 90%, when one employs a $B_2O_3$ to Mg ratio of 3 to 1, to as much as 95% and more if ratios of the order of 1.5 to 1 are utilized.

The liquor from the last mentioned acid digestion is returned to the first acid digestion step where it is utilized. The resulting digestion liquor is then separated by filtration, neutralized with a borate such as sodium tetraborate pentahydrate or decahydrate to produce boric acid. The resulting liquor is evaporated and cooled to 30° C. to produce a crop of boric acid crystals which is separated and dried and used as a make-up source of boric oxide. Evaporation is conducted to the extent that a mother liquor is produced which is nearly saturated with sodium chloride at 30° C. The boric acid cake wash liquor is recycled to the alkali borate neutralization step. The mother liquor is discarded to bleed the impurities from the system. This phase of the process represents an economy in operation of a cyclic process. It is not, however, limited in utility to the ratio of the reactants since it can be used as well with a material resulting from use of a reactant ratio of 3 to 1 and of 1.5 to 1.

As illustrative of practice of the invention, the following specific example is set forth to show how the process is practiced in one instance.

A mixture of 150 pounds of boric oxide was mixed with 100 pounds of magnesium metal powder, the latter all passing a 50-mesh screen and being retained on a 100-mesh screen. After thorough mixing the mass was placed in a thin wall metal drum of adequate size. A cylindrical metal canopy was lowered over the charge. A continuous flow of ammonia was maintained to the canopy to maintain the drum and the charge in a non-oxidizing atmosphere, a flow of two liters of ammonia per minute sufficing. The reaction was initiated by raising the canopy slightly and heating a small area of the container with a welding torch. Approximately twelve minutes were required for completion of the reduction reaction. The mass was then allowed to cool overnight, the flow of ammonia being continued. When the mass was cold, the flow of ammonia was stopped and the canopy removed. The container was stripped from the reaction mass which was then broken up, crushed to minus ½ inch and charged with 250 pounds of water into a batch ball mill, where it was ground for two hours. The resulting pulp contained 250 pounds of solids of which 90% would pass a 200-mesh screen.

The resulting pulp was placed in a steam jacketed Pfaudler reactor with 1757 pounds of water, 112.6 gallons of 20 Bé hydrochloric acid and 489 pounds of second digestion filtrate from a previous refining step. The total quantity of acid present was 1.2 times that required theoretically to convert all the magnesium in the reaction mass to equivalent magnesium chloride. The slurry was digested at 100° C. for two hours and then filtered.

The filtrate from the first acid digestion step above was combined with the water leach filtrate from the second acid-digestion-water leach steps, presently described, the quantities being respectively 3771 pounds and 2463 pounds. This was neutralizeed with 246.9 pounds of sodium tetraborate pentahydrate, the neutralized liquor being evaporated and cooled to 30° C. and 645 pounds of boric acid recovered. This was washed free of entrained liquor, dried and recycled to the boric oxide fusion furnace.

It is to be observed that the boric acid produced by neutralization of excess hydrochloric acid with an alkali metal borate suffices to provide the major portion of the boric oxide required. In the above operation, only 13.8 pounds of make-up boric acid are required and the principal boron source is provided as the less expensive alkali metal borate, e. g., a sodium borate.

To control the level of magnesium chloride and sodium chloride impurities, 1845 pounds of filtrate were discarded from the second acid digestion-water leach.

To remove solid impurities from the acid leached crude boron filter cake, a two-stage froth flotation operation was employed. This served to remove 4.47 pounds of boron nitride impurities as a tailing from 64.2 pounds of the wet filter cake. The purified under-flow slurry was fed as a 3.5% pulp to a filter on which it was given a displacement wash. The filter cake was dried in a vacuum oven to give 27.61 pounds of high magnesium-bearing boron, the dried material analyzing as follows:

| Constituent | Percent |
| --- | --- |
| Boron | 86.75 |
| Water soluble boron | 0.07 |
| Magnesium | 11.15 |
| Nitrogen | 0.53 |
| Unidentified (by diff.) | 1.50 |
| | 100.00 |

Although this material contains less boron than produced with a high ratio of $B_2O_3$ to Mg, nevertheless it can be leached successfully to remove magnesium impurities whereas an otherwise similar product produced at a high $B_2O_3$ to Mg ratio cannot be leached with molten boric oxide to improve its quality.

The 27.61 pounds of product was mixed with 207.1 pounds of boric oxide, a ratio of 7.5 to 1. The mixture was heated to 800° C. for two hours and then permitted to cool. The boric oxide was then removed with 2267 pounds of water at 100° C. The refined boron slurry was filtered, 2463 pounds of filtrate containing 204 pounds of $B_2O_3$ being recovered and sent to the neutralization step wherein the filtrate from the first and second acid digestion liquors are treated for boric acid recovery.

The filter cake was then digested with a 12% hydrochloric acid solution, the slurry being filtered and the cake washed. The acid filtrate containing 16.4 pounds of free hydrochloric acid is sent to the first acid digestion. The cake, weighing 36.4 pounds, was dried in a vacuum drier to yield 24.24 pounds of material analyzing as follows:

| Constituent | Percent |
| --- | --- |
| Boron | 95.10 |
| Water soluble boron | 0.03 |
| Magnesium | 2.24 |
| Nitrogen | 0.50 |
| Unidentified (by diff.) | 2.13 |
| | 100.00 |

We claim:

1. In a process for producing a boron substantially free of boron suboxide as an impurity and including: fusing in a non-oxidizing atmosphere a mixture of boron oxide and magnesium, the weight ratio of boric oxide to magnesium being between about 1 and 1.5 to 1 to provide a crude boron product substantially free of boron suboxides; treating the product so formed with an excess of a mineral acid to convert the magnesium present to a water soluble magnesium compound; and separating the crude boron product so formed substantially free of boron suboxides and acid soluble magnesium compounds; the improvement consisting in leaching the last mentioned crude boron product with molten boric oxide.

2. In a process for producing substantially pure boron and including: fusing in a non-oxidizing atmosphere a mixture of boron oxide and magnesium, the weight ratio of boric oxide to magnesium being between about 1 and 1.5 to 1 to provide a crude boron product substantially free of boron suboxides and containing magnesium impurities resulting from the magnesiothermic reduction of boric oxide; treating the product so formed with an excess of a mineral acid to convert a portion of the magnesium impurities present to a water soluble magnesium compound; separating the crude boron product so formed substantially free of boron suboxides and water soluble magnesium compounds; the improvement consisting in forming a mixture of the last mentioned crude boron product and boron oxide; heating the mixture so formed to liquefy said boron oxide and to leach from said crude boron product magnesium containing impurities insoluble in said mineral acid; leaching the boric oxide from the partially purified product so formed; and separating therefrom a boron product substantially free of boron suboxide and magnesium containing impurities, and containing at least 95% boron.

3. The process of claim 2, wherein the weight ratio of boric oxide to crude boron-containing material is in excess of about 7.5 to 1.

4. The process of claim 2, wherein the boric oxide leaching step takes place for at least about one hour at a temperature of at least about 800° C.

5. The process of claim 2, wherein a crude boron product is separated by filtration from the water soluble magnesium salt formed by the acid treatment; and the solid materials separated from the filtrate are subjected to a froth flotation operation whereby to separate solid impurities from said partially purified boron product.

6. The process of claim 2, wherein said molten boric oxide is cooled and water-leached from said partially purified boron product; the said product is further treated with hydrochloric acid to remove additional acid soluble impurities; and the pure boron product is separated therefrom by filtration.

7. In a process for producing substantially pure boron including: fusing in a non-oxidizing atmosphere a mixture of boron oxide and magnesium, said ingredients being present in a weight ratio of between about 1 and 1.5 to 1, to provide a crude boron product substantially free of boron suboxides and containing magnesium impurities resulting from the magnesiothermic reduction of boric oxide; treating the crude product so formed with an excess of hydrochloric acid to convert a portion of the magnesium impurities present to water soluble magnesium chloride; separating the magnesium chloride so formed from said crude boron product by filtration; subjecting the crude boron product so separated to a froth flotation operation whereby to separate solid impurities from said partially purified boron product; the improvement consisting in forming a mixture of the last mentioned said partially purified boron product and boron oxide; heating said mixture to liquefy said boron oxide and to leach from the said partially purified boron product magnesium containing impurities insoluble in said hydrochloric acid; said boron oxide being present relative to said crude boron product in a weight ratio of at least about 7.5 to 1, said leaching step being carried out at a temperature of at least about 800° C. for a period of at least about one hour; cooling the product so formed and water-leaching the boron oxide from said partially purified product so formed; and separating therefrom a boron product substantially free of boron suboxide and magnesium containing impurities and containing at least 95% boron.

8. In a process of producing boron from a crude product resulting from the magnesiothermic reduction of boric oxide, the step consisting in leaching said crude product with molten boric oxide.

9. In a process of producing boron from a crude product resulting from the magnesiothermic reduction of boric oxide, the step consisting in leaching said crude product with about 7½ parts of molten boric oxide to one of the product.

10. In a process of producing boron from a crude product resulting from the magnesiothermic reduction of boric oxide, the step consisting in leaching said crude product for about an hour at 800° C. with about 7½ parts of molten boric oxide to one of the product.

References Cited in the file of this patent

UNITED STATES PATENTS

| | | |
|---|---|---|
| 1,019,392 | Weintraub | Mar. 5, 1912 |
| 2,465,989 | Sowa | Apr. 5, 1949 |
| 2,685,501 | Spevack | Aug. 3, 1954 |

FOREIGN PATENTS

| | | |
|---|---|---|
| 193,894 | Great Britain | Mar. 1, 1923 |
| 397,463 | Great Britain | Nov. 20, 1931 |